United States Patent
Chang et al.

(10) Patent No.: US 12,171,014 B2
(45) Date of Patent: Dec. 17, 2024

(54) MACHINE LEARNING ASSISTED USER PRIORITIZATION METHOD FOR ASYNCHRONOUS RESOURCE ALLOCATION PROBLEMS

(71) Applicant: Telefonaktiebolaget LM Ericsson (publ), Stockholm (SE)

(72) Inventors: Peiliang Chang, Åkersberga (SE); Akram Bin Sediq, Kanata (CA); Mats Zachrison, Örebro (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 18/707,254

(22) PCT Filed: Nov. 10, 2021

(86) PCT No.: PCT/IB2021/060424
§ 371 (c)(1),
(2) Date: May 3, 2024

(87) PCT Pub. No.: WO2023/084277
PCT Pub. Date: May 19, 2023

(65) Prior Publication Data
US 2024/0340939 A1 Oct. 10, 2024

(51) Int. Cl.
*H04W 4/00* (2018.01)
*H04L 5/00* (2006.01)
(Continued)

(52) U.S. Cl.
CPC ......... *H04W 72/535* (2023.01); *H04L 5/0051* (2013.01); *H04W 24/02* (2013.01); *H04W 76/36* (2018.02)

(58) Field of Classification Search
CPC ... H04W 72/535; H04W 76/36; H04W 24/02; H04L 5/0051
(Continued)

(56) References Cited

U.S. PATENT DOCUMENTS 10,200,985 B2 * 2/2019 Chen ............... H04L 5/0094
10,707,578 B1 * 7/2020 Tran ............... H01Q 3/44
(Continued)

FOREIGN PATENT DOCUMENTS

WO 2017029539 A1 2/2017
WO 2019125248 A1 6/2019
(Continued)

OTHER PUBLICATIONS

International Search Report and Written Opinion of the International Searching Authority, PCT/IB2021/060424, mailed Jul. 4, 2022, 10 pages.

*Primary Examiner* — Marceau Milord
(74) *Attorney, Agent, or Firm* — Sage Patent Group

(57) ABSTRACT

A network node, computer program, computer program product, and a method performed in a network node includes obtaining an estimated data amount of a user equipment, UE, and a resource utilization rate. A percentile R of the estimated data amount is obtained based on a data amount distribution table. The percentile R is compared to the resource utilization rate. Responsive to the percentile R being higher than the resource utilization rate, a resource is allocated to the UE.

25 Claims, 8 Drawing Sheets

(51) Int. Cl.
    *H04W 24/02*     (2009.01)
    *H04W 72/50*     (2023.01)
    *H04W 76/36*     (2018.01)

(58) Field of Classification Search
    USPC .......................................................... 370/329
    See application file for complete search history.

(56) References Cited

U.S. PATENT DOCUMENTS

| | | | |
|---|---|---|---|
| 10,904,913 B2* | 1/2021 | Kim | H04W 72/121 |
| 2012/0014332 A1* | 1/2012 | Smith | H04W 72/04 |
| | | | 370/329 |
| 2012/0331478 A1 | 12/2012 | Zhu et al. | |
| 2014/0029455 A1* | 1/2014 | Vitthaladevuni | H04W 24/02 |
| | | | 370/252 |
| 2014/0192734 A1* | 7/2014 | Ng | H04L 5/0042 |
| | | | 370/329 |
| 2014/0334318 A1* | 11/2014 | Pica | H04W 36/08 |
| | | | 370/252 |
| 2016/0234828 A1* | 8/2016 | Smith | H04W 16/14 |
| 2016/0295624 A1* | 10/2016 | Novlan | H04L 67/12 |
| 2017/0019934 A1* | 1/2017 | Yang | H04W 28/0278 |
| 2020/0367278 A1* | 11/2020 | Hosseini | H04L 5/0064 |
| 2021/0014893 A1* | 1/2021 | Park | H04W 80/08 |
| 2021/0282121 A1* | 9/2021 | Selvanesan | H04W 4/08 |

FOREIGN PATENT DOCUMENTS

| | | |
|---|---|---|
| WO | 2019125250 A1 | 6/2019 |
| WO | 2021181137 A1 | 9/2021 |

\* cited by examiner

MACHINE LEARNING ASSISTED USER PRIORITIZATION METHOD FOR ASYNCHRONOUS RESOURCE ALLOCATION PROBLEMS

CROSS REFERENCE TO RELATED APPLICATIONS

This application is a 35 U.S.C. § 371 national stage application of PCT International Application No. PCT/IB2021/060424 filed on Nov. 10, 2021, the disclosure and content of which is incorporated by reference herein in its entirety.

TECHNICAL FIELD

The present disclosure relates generally to communications, and more particularly to communication methods and related devices and nodes supporting wireless communications.

BACKGROUND

There are dynamic asynchronous resource allocation problems in systems including but not limited to radio access networks (RAN). As in FIG. 1, in such problems, a controller needs to assign a set of limited resources to a set of users. The set of users changes dynamically such that users arrive to the system, request and receive services, and then leave the system when the service is completed. A user may get at most one resource. A user can benefit from obtaining a resource. The resource set has a fixed number of resources, some of which are allocated to certain users and the others remain available and to be allocated. The resources are homogenous such that the users have no preference on the resources, i.e., a user obtains the same benefit with two different resources. However, the benefit of allocating a resource to a user may be different from that of allocating the resource to another user.

The controller controls the allocation of available resources to users that have no resources and deallocations of resources from users that have resources. Due to the fact that user equipments (UEs) arrive and request resources asynchronously, the resource allocation decisions are made asynchronously. The resource allocation can be repeated periodically. The repeated allocation decisions of all users are also asynchronous. With the objective to maximize the overall benefit obtained from the limited resources, the controller prefers to allocate the resources to the users that can gain more benefit. Therefore, there exists user preference in the resource allocation problem such that the users that benefit more are more preferred to get resources.

There currently exist certain challenge(s). One challenge of such a resource allocation problem is that for a given user, the benefit of having a resource is not known at the moment of resource allocation, as the benefit depends on the future usage of the resource. Without knowing the benefit of allocating a resource to the users, it is difficult for the controller to decide which users should get the resources and which users should not get the resources. A desired resource allocation solution should prioritize the users that will have higher benefit.

Another challenge of such a resource allocation problem is that the number of users in the system is changing and the availability of resources is dynamically varying. When the number of users is low, all the users may get resources if the number of resources is larger than that of users. However, during high load period, the number of users may be much larger than the number of resources and only some of the users may get resources. A desired resource allocation solution should be able to adapt to the varying load of resource request.

A further challenge of such a resource allocation problem is that UEs arrive and request resources asynchronously and the resource allocation decision for each user is made asynchronously. This can be compared to the situation where the UEs are allocated resource in batch where the resource allocation decisions of multiple UEs are made together and they can be compared to get the UE priority. A desired resource allocation should be able to handle the asynchronous resource request and determine the UE priority without comparing the candidate UEs.

SUMMARY

One example of such resource allocation problems is the allocation of sounding reference signal (SRS) resources in multi-user multiple input multiple output (MU-MIMO) systems. In such systems, the users are the radio resource control (RRC) connected users and the resources are the SRSs which are a set of time-frequency elements. On these resource elements, users can send out sounding references in the uplink, and base stations (BS) can estimate channel state information with the received sounding signals. With the estimated channel state information (CSI), the BS may perform MU-MIMO transmission and schedule users on the same time-frequency resources to transmit data. The UEs that don't have SRS resources will not be scheduled to perform MU-MIMO transmission. Only the users that have SRS resources can participate in MU-MIMO transmission. However, in order to be scheduled to perform MU-MIMO transmission, a user also needs to have data in the buffer. If a user gets allocated the SRS resource but has no data to transmit, it will not participate in MU-MIMO transmission, and the benefit of allocating SRS resources to such user is zero.

In this example, the SRS resources are allocated/deallocated dynamically. At the moment when BS allocates/deallocates SRS resources, it is unclear which user will have large data bulk to transmit. When there are more connected users that the SRS resources, the BSs need to select certain users and allocate SRS resources to these users. The more users in the system, the more selective the resource allocation should be. Ideally, the SRS resources should be allocated to the users that have the largest amount of data to transmit. And the users that are more likely to transmit large amounts of data are more preferred.

Certain aspects of the disclosure and their embodiments may provide solutions to these or other challenges. In some embodiments of inventive concepts, a machine-learning assisted user prioritization method for solving the dynamic resource allocation problems in systems includes but is not limited to radio access networks (RAN). In this method, for a given candidate user and a given resource utilization rate, any existing scheme that outputs the preference value of the candidate user is first used: such scheme can be developed using a machine learning method such as linear regression, neural network or random forest, or it can be developed using any other classical method. The higher the preference value is, the more preferred the user is. The evaluated preference value is then compared against a distribution table of preference values and the percentile of the preference value in the distribution table is obtained. The higher the preference value is, the higher the percentile is. Meanwhile, the number of future users is estimated with a traffic forecast method, such as AutoRegressive Integrated Moving Average (ARIMA), Holt-Winter Exponential Smoothing method, linear regression, neural network or random forest. The number of future users that would have higher preference value is then estimated based on the number of future users and the user's percentile. If the number of future users that would have higher preference value than that of the candidate user is smaller than the number of remaining resources, the candidate user will get a resource if it has not been assigned any resource or will maintain a previously-obtained resource. Otherwise, the candidate user needs to release the previously-obtained resource or it will not get any resource if it has not been assigned any resource.

According to some embodiments of inventive concepts, a method performed in a network node includes obtaining an estimated data amount of a user equipment, UE, and a resource utilization rate. The method includes obtaining a percentile R of the estimated data amount based on a data amount distribution table. The method includes comparing the percentile R to the resource utilization rate. The method includes responsive to the percentile R being higher than the resource utilization rate, allocating a resource to the UE.

Analogous network nodes, computer programs, and computer program products are provided.

Certain embodiments may provide one or more of the following technical advantage(s). Some of the advantages that may be achieved include: a benefit prediction model is used to infer the potential benefit of allocating resources to one user and address the first challenge. Users with higher predicted benefit are prioritized. A dynamic decision threshold is applied to the predicted benefit to select the users that should get resources, so that the resource allocation is adaptive to the resource request load.

According to other embodiments of inventive concepts, a method performed in a network node includes obtaining an estimated data amount of a candidate user equipment, UE, and a number $N_r$ of remaining resources. The method includes obtaining a percentile R of the estimated data amount based on a data amount distribution table. The method includes forecasting a number K of future users in a prediction window. The method includes calculating a number $K_1$ of future users that would have higher data amounts than the estimated data amount of the candidate user. The method includes determining whether the number $N_r$ is greater than the calculated number $K_1$ of future users. The method includes responsive to the calculated number $K_1$ being smaller than the number $N_r$, allocating a resource to the UE.

Analogous network nodes, computer programs, and computer program products are provided.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
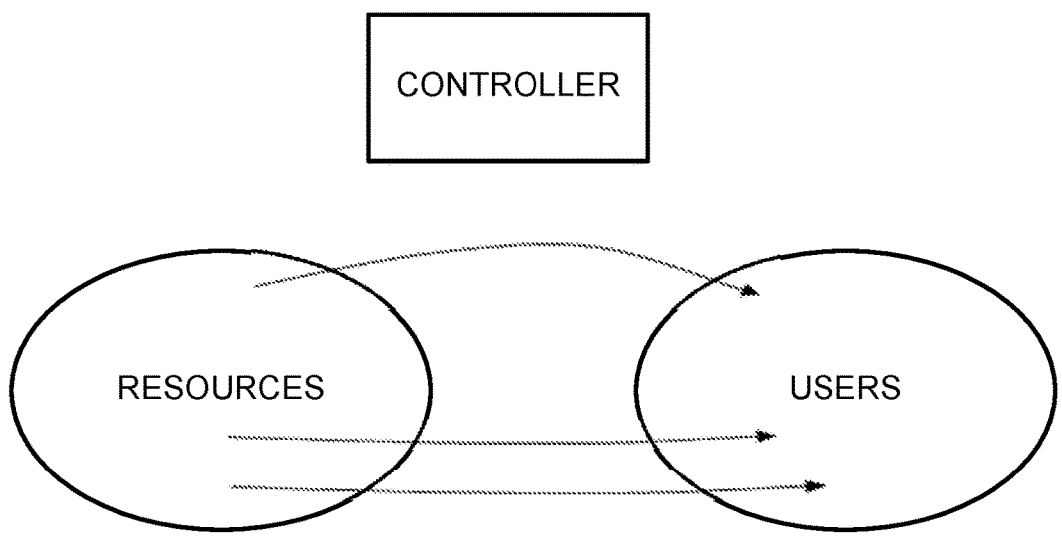
FIG. 1 is an illustration of a resource allocation system.

Some of the embodiments contemplated herein will now be described more fully with reference to the accompanying drawings. Embodiments are provided by way of example to convey the scope of the subject matter to those skilled in the art, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

As previously indicated, one example of such resource allocation problems is the allocation of sounding reference signal (SRS) resources in multi-user multiple input multiple output (MU-MIMO) systems. In such systems, the users are the radio resource control (RRC) connected users and the resources are the SRSs which are a set of time-frequency elements. On these resource elements, users can send out sounding references in the uplink, and base stations (BS) can estimate channel state information with the received sounding signals. With the estimated channel state information (CSI), the BS may perform MU-MIMO transmission and schedule users on the same time-frequency resources to transmit data. The UEs that don't have SRS resources will not be scheduled to perform MU-MIMO transmission. Only the users that have SRS resources can participate in MU-MIMO transmission. However, in order to be scheduled to perform MU-MIMO transmission, a user also needs to have data in the buffer. If a user gets allocated the SRS resource but has no data to transmit, it will not participate in MU-MIMO transmission, and the benefit of allocating SRS resources to such user is zero.

In this example, the SRS resources are allocated/deallocated dynamically. At the moment when BS allocates/ deallocates SRS resources, it is unclear which user will have large data bulk to transmit. When there are more connected users that the SRS resources, the BSs need to select certain users and allocate SRS resources to these users. The more users in the system, the more selective the resource allocation should be. Ideally, the SRS resources should be allocated to the users that have the largest amount of data to transmit. And the users that are more likely to transmit large amounts of data are more preferred.

One solution for the above resource allocation problems is to apply the first-in-first-serve approach and allocate resources to users when there are available resources. This solution is not efficient as it doesn't consider the fact that users would have different benefits from obtaining the resources. The users that would benefit more are not prioritized to get resources.

Another solution for the above resource allocation problems is to predict the benefit of allocating a resource to a user. All users that have higher benefit than a threshold are entitled to get resources and the others are not. However, in such solution, the predicted benefit is compared against a fixed threshold and it is not adapting to the varying resource request load.

Another solution for the resource allocation problems is to predict the resource usage of the UE and then make resource allocation decisions by comparing the predicted resource usage to a threshold that is dynamically adapted to the traffic load. However, only the general idea of adapting the decision threshold to the traffic load is introduced and the concrete way how the decision threshold dynamically adapts to the traffic load is not presented.

Another solution introduces a concrete method to adapt the decision threshold to the resource utilization rate, where the decision thresholds for allocating/de-allocating a resource to/from a UE are dynamically adjusted according to resource utilization rate. This approach requires a threshold adaptation process to get the optimal thresholds which takes time to converge. Meanwhile, the performance of the resource allocation solution may be affected by the initial thresholds as well as the adaption steps.

Described herein are various embodiments of inventive concepts of a machine-learning assisted user prioritization method for solving the dynamic resource allocation problems in systems including but not limited to radio access networks (RAN). In this method, for a given candidate user and a given resource utilization rate, we first use any existing scheme that outputs the preference value of the candidate user: such scheme can be developed using an existing machine learning method such as linear regression, neural network or random forest, or it can be developed using any other classical method. The higher the preference value is, the more preferred the user is. The evaluated preference value is then compared against a distribution table of preference values and the percentile of the preference value in the distribution table is obtained. The higher the preference value is, the higher the percentile is. Meanwhile, the number of future users is estimated with an existing traffic forecast method, such as ARIMA, Holt-Winter Exponential Smoothing method, linear regression, neural network or random forest. The number of future users that would have higher preference value is then estimated based on the number of future users and the user's percentile. If the number of future users that would have higher preference value than that of the candidate user is smaller than the number of remaining resources, the candidate user will get a resource if it has not been assigned any resource or will maintain a previously-obtained resource. Otherwise, the candidate user needs to release the previously-obtained resource or it will not get any resource if it has not been assigned any resource.

The various embodiments of inventive concepts shall be described using an example of SRS allocation in long term evolution (LTE) downlink (DL) MU-MIMO systems. However, the inventive concepts are not so limited and are applicable in other embodiments.

Problem of SRS Allocation in LTE DL MU-MIMO System

DL MU-MIMO Transmission in LTE

Figure 2:
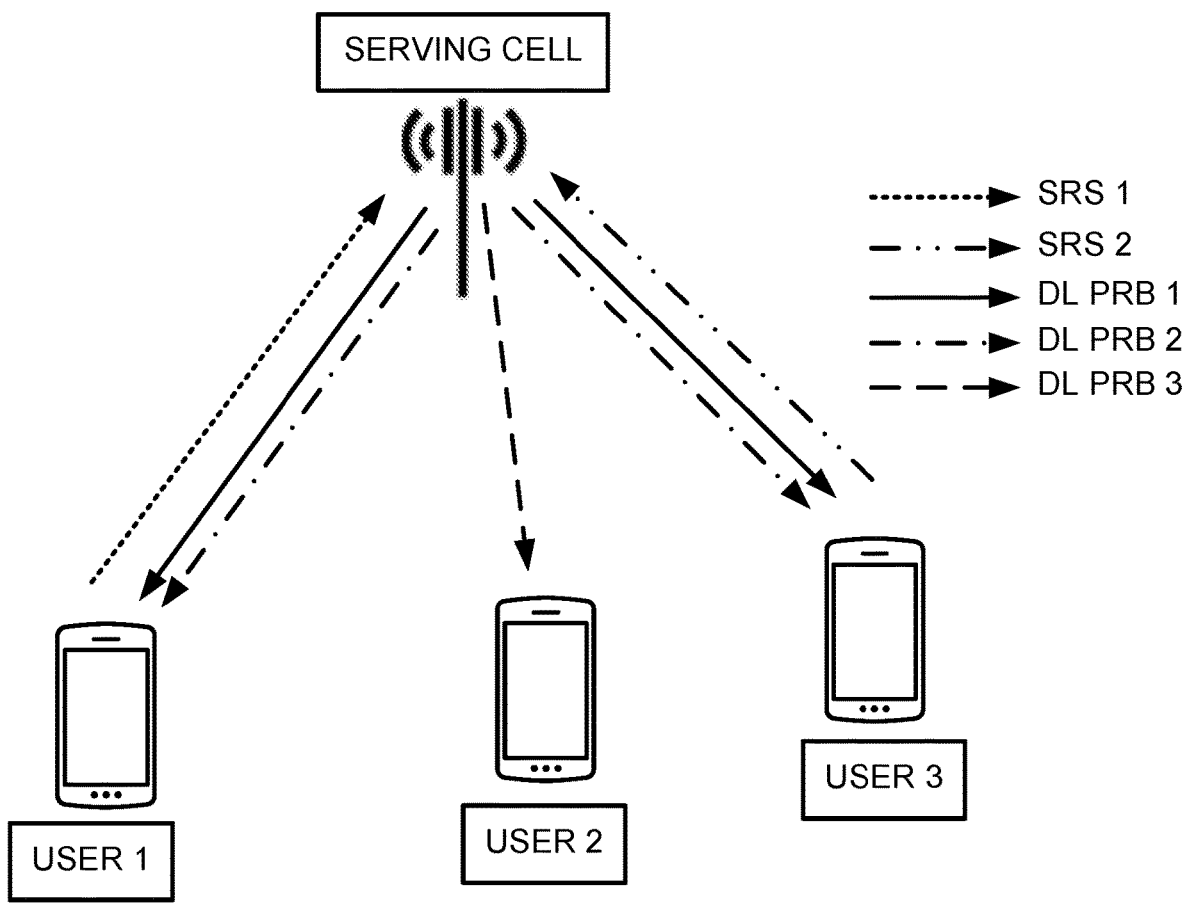
FIG. 2 is an illustration of LTE DL MU-MIMO according to some embodiments.

The DL MU-MIMO transmission technique is used to improve user throughput in LTE and new radio (NR) systems. In such systems, the users are the RRC connected users and the resources are the SRS resources which are a set of time-frequency elements. With these resource elements, users can send out sounding references in the uplink, and base stations (BS) can estimate channel state information (CSI) with the received sounding signals. With the estimated CSI, the BS may perform MU-MIMO transmission and schedule users on the same time-frequency resources to transmit data. The UEs that do not have SRS resource will not be scheduled to perform MU-MIMO transmission. Only the users that have SRS resources can participate in the MU-MIMO transmission. FIG. 2 illustrates one example of DL MU-MIMO transmission in LTE. In this example, there are 3 users and 2 SRS resources. The user equipment of User 1 and User 3 get the two SRS resources, and the user equipment of User 2 does not get any SRS resources. The user equipment of User 1 and 3 transmit SRSs on their SRS resources, then the base station can estimate the CSI of User 1 and User 3 with the received SRSs. Then the base station could schedule the user equipment of User 1 and User 3 on the same time-frequency resources and apply MU-MIMO transmission. So that amount of physical resource blocks (PRBs) that are used to serve User 1 and User 3 are doubled, which results in higher user throughput for these two users. However, User 2 does not obtain such throughput improvement.

Besides having SRS resources, another condition for users to actively participate in MU-MIMO transmission and gain high throughput is that the user should have data in the buffer to transmit. For example, in the above example, the base station cannot apply MU-MIMO transmission to serve User 1 and User 3 if one of them have no data to transmit.

SRS Resource Allocation and Deallocation

In LTE, each cell has a limited number of SRS resources. Not all the users can obtain SRS resources. When a new user becomes connected, the base station needs to decide whether this new user should get an SRS resource or not. Meanwhile, the base station needs to decide whether it should revoke the SRS resource from a user who has been previously allocated an SRS resource. The SRS allocation/deallocation are done by sending an RRC configuration message to each user. In order to save RRC message resources, the SRS allocation/deallocation for each user usually occurs periodically, such as every 5 seconds. This means if the base station wants to revoke/allocation SRS resource from/to a user, the base station should wait until the current period ends. Therefore, each SRS allocation decision covers the upcoming decision period. The SRS allocation/deallocation decision for all users can be asynchronous.

As the number of connected users varies from time to time and the number of SRS resources is fixed, the scarcity of SRS resources is time dependent. At low load periods where there are more SRS resources than connected users, all the users may get SRS resources. However, during high load periods when there are more users than SRS resources, the base stations can only allocate the SRS resources to some but not all of the users. As different users have different data amounts, the benefits of obtaining one SRS resource are not the same for all the users. The problem is how should the base station allocate resources such as SRS resources among all users to maximize the overall benefit of the resources such as the SRS resources.

Prior to discussing the various embodiments of inventive concepts, components used in various embodiments shall be described.

Figure 3:
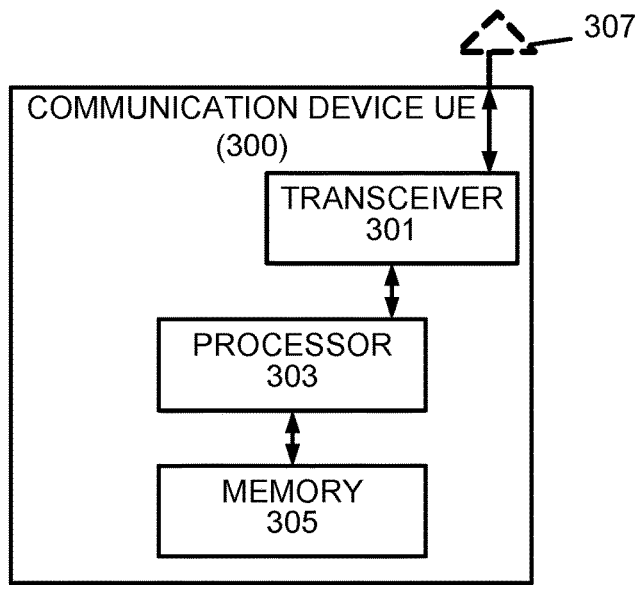
FIG. 3 is a block diagram illustrating a wireless device UE according to some embodiments of inventive concepts.

FIG. 3 is a block diagram illustrating elements of a communication device UE 700 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 300 may be provided, for example, as discussed below with respect to wireless devices UE 1012A, UE 1012B, and wired or wireless devices UE 1012C, UE 1012D of FIG. 10, UE 1100 of FIG. 11, virtualization hardware 1404 and virtual machines 1408A, 1408B of FIG. 14, and UE 1506 of FIG. 15, all of which should be considered interchangeable in the examples and embodiments described herein and be within the intended scope of this disclosure, unless otherwise noted.) As shown, communication device UE may include an antenna 307 (e.g., corresponding to antenna 1122 of FIG. 11), and transceiver circuitry 301 (also referred to as a transceiver, e.g., corresponding to interface 1112 of FIG. 11 having transmitter 1118 and receiver 1120) including a transmitter and a receiver configured to provide uplink and downlink radio communications with a base station(s) (e.g., corresponding to network node 1010A, 1010B of FIG. 10, network node 1200 of FIG. 12, and network node 1504 of FIG. 15 also referred to as a RAN node) of a radio access network. Communication device UE may also include processing circuitry 303 (also referred to as a processor, e.g., corresponding to processing circuitry 1102 of FIG. 11, and control system 1412 of FIG. 14) coupled to the transceiver circuitry, and memory circuitry 305 (also referred to as memory, e.g., corresponding to memory 1110 of FIG. 10) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Communication device UE 300 may also include an interface (such as a user interface) coupled with processing circuitry 303, and/or communication device UE may be incorporated in a vehicle.

As discussed herein, operations of communication device UE may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments relating to wireless communication devices). According to some embodiments, a communication device UE 300 and/or an element(s)/function(s) thereof may be embodied as a virtual node/nodes and/or a virtual machine/machines.

Figure 4:
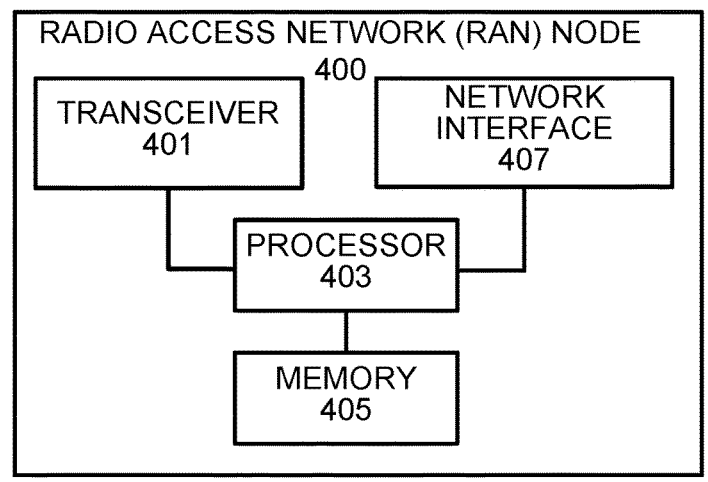
FIG. 4 is a block diagram illustrating a radio access network RAN node (e.g., a base station eNB/gNB) according to some embodiments of inventive concepts.

FIG. 4 is a block diagram illustrating elements of a radio access network RAN node 400 (also referred to as a network node, base station, eNodeB/eNB, gNodeB/gNB, etc.) of a Radio Access Network (RAN) configured to provide cellular communication according to embodiments of inventive concepts. (RAN node 400 may be provided, for example, as discussed below with respect to network node 1010A, 1010B of FIG. 10, network node 1200 of FIG. 12, hardware 1404 or virtual machine 1408A, 1408B of FIG. 14, and/or base station 1504 of FIG. 15, all of which should be considered interchangeable in the examples and embodiments described herein and be within the intended scope of this disclosure, unless otherwise noted.) As shown, the RAN node may include transceiver circuitry 401 (also referred to as a transceiver, e.g., corresponding to portions of RF transceiver circuitry 1212 and radio front end circuitry 1218 of FIG. 12) including a transmitter and a receiver configured to provide uplink and downlink radio communications with mobile terminals. The RAN node may include network interface circuitry 407 (also referred to as a network interface, e.g., corresponding to portions of communication interface 1206 of FIG. 12) configured to provide communications with other nodes (e.g., with other base stations) of the RAN and/or core network CN. The network node may also include processing circuitry 403 (also referred to as a processor, e.g., corresponding to processing circuitry 1202 of FIG. 12) coupled to the transceiver circuitry, and memory circuitry 405 (also referred to as memory, e.g., corresponding to memory 1204 of FIG. 12) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the RAN node may be performed by processing circuitry 403, network interface 407, and/or transceiver 401. For example, processing circuitry 403 may control transceiver 401 to transmit downlink communications through transceiver 401 over a radio interface to one or more mobile terminals UEs and/or to receive uplink communications through transceiver 401 from one or more mobile terminals UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations (e.g., operations discussed below with respect to Example Embodiments relating to RAN nodes). According to some embodiments, RAN node 400 and/or an element(s)/function(s) thereof may be embodied as a virtual node/nodes and/or a virtual machine/machines.

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 5:
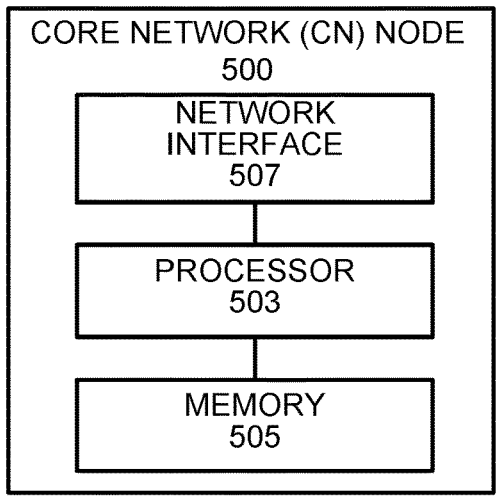
FIG. 5 is a block diagram illustrating a core network CN node (e.g., an AMF node, an SMF node, etc.) according to some embodiments of inventive concepts.

FIG. 5 is a block diagram illustrating elements of a core network (CN) node 500 (e.g., an SMF (session management function) node, an AMF (access and mobility management function) node, etc.) of a communication network configured to provide cellular communication according to embodiments of inventive concepts. (CN node 900 may be provided, for example, as discussed below with respect to core network node 1008 of FIG. 10, hardware 1404 or virtual machine 1408A, 1408B of FIG. 14, all of which should be considered interchangeable in the examples and embodiments described herein and be within the intended scope of this disclosure, unless otherwise noted) As shown, the CN node may include network interface circuitry 507 configured to provide communications with other nodes of the core network and/or the radio access network RAN. The CN node may also include a processing circuitry 503 (also referred to as a processor,) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the CN node may be performed by processing circuitry 503 and/or network interface circuitry 507. For example, processing circuitry 903 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations (e.g., operations discussed below with respect to Example Embodiments relating to core network nodes). According to some embodiments, CN node 500 and/or an element(s)/function(s) thereof may be embodied as a virtual node/nodes and/or a virtual machine/machines.

In the various embodiments of inventive concepts, a machine learning assisted user prioritization method to address the above SRS resource allocation problem is disclosed. The SRS resources are allocated to the users that would have large amounts of DL data transmission in the upcoming decision period, and the allocation is load-adaptive. The users are prioritized based on their estimated data amount, and depending on the load and the scarcity of SRS resources, only the highly prioritized users can get SRS resources.

Step 1—Observation

Figure 6:
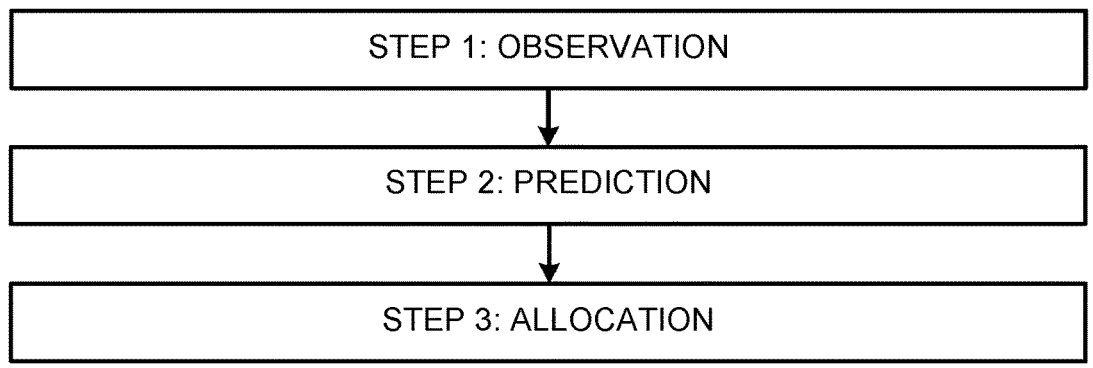
FIG. 6 is an illustration of machine-learning assisted user prioritization for resource allocation according to some embodiments of inventive concepts.
Figure 7:
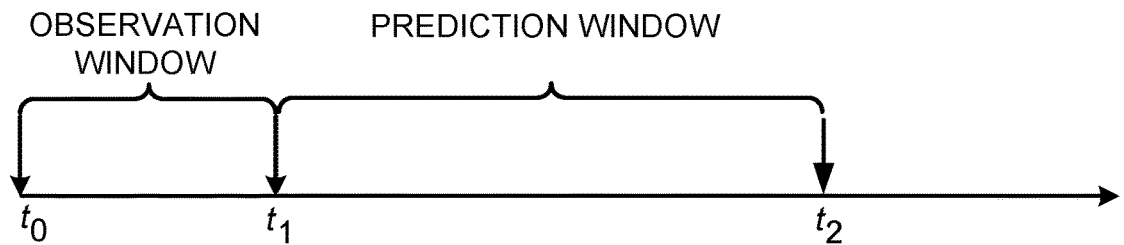
FIG. 7 is an illustration of user session time periods according to some embodiments.

As illustrated in FIG. 6, the overall steps in various embodiments of inventive concepts use three steps: observation, prediction, and allocation. For each user, the first step is to observe the user traffic and collect user traffic statistics. The time periods of a connected session are illustrated in FIG. 7. The session connection is established at time to. In order to estimate the session's data amount, the base station needs to observe its traffic statistic for a certain time, until time $t_1$. In the observation periods, all the required inputs for predicting the user's data amount in Step 2 are collected.

Step 2—Prediction

The second step is to input the collected user traffic statistics into a trained machine learning model that is generally off-line and predict the user's DL transmission data amount y in the upcoming decision period, which is also called prediction window. The function of the machine learning model is to predict the user's data amount in the prediction window. Other machine learning models may also be used, for example, a model to predict the probability that the data amount is larger than a certain threshold. Any existing machine learning methods including but not limited to linear regression, decision tree, random forests and neural networks can be used to develop the above model.

Step 3—Resource Allocation

In the third step, whether to allocate a resource to the candidate user or not is decided based on the predicted data amount (e.g., data volume) of the candidate user and the resource utilization rate of the system.

Figure 10:
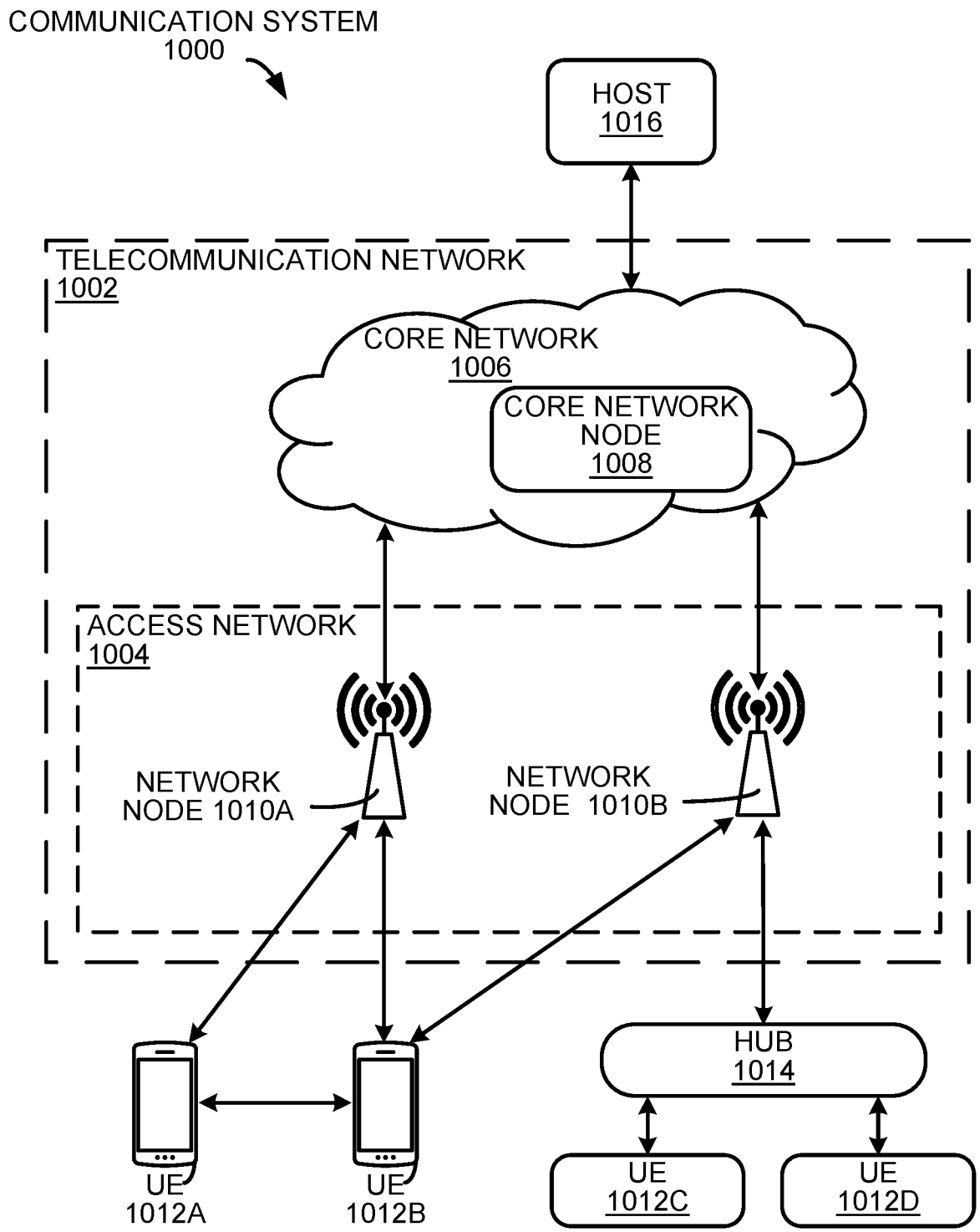
FIG. 10 is a block diagram of a communication system in accordance with some embodiments.
Figure 12:
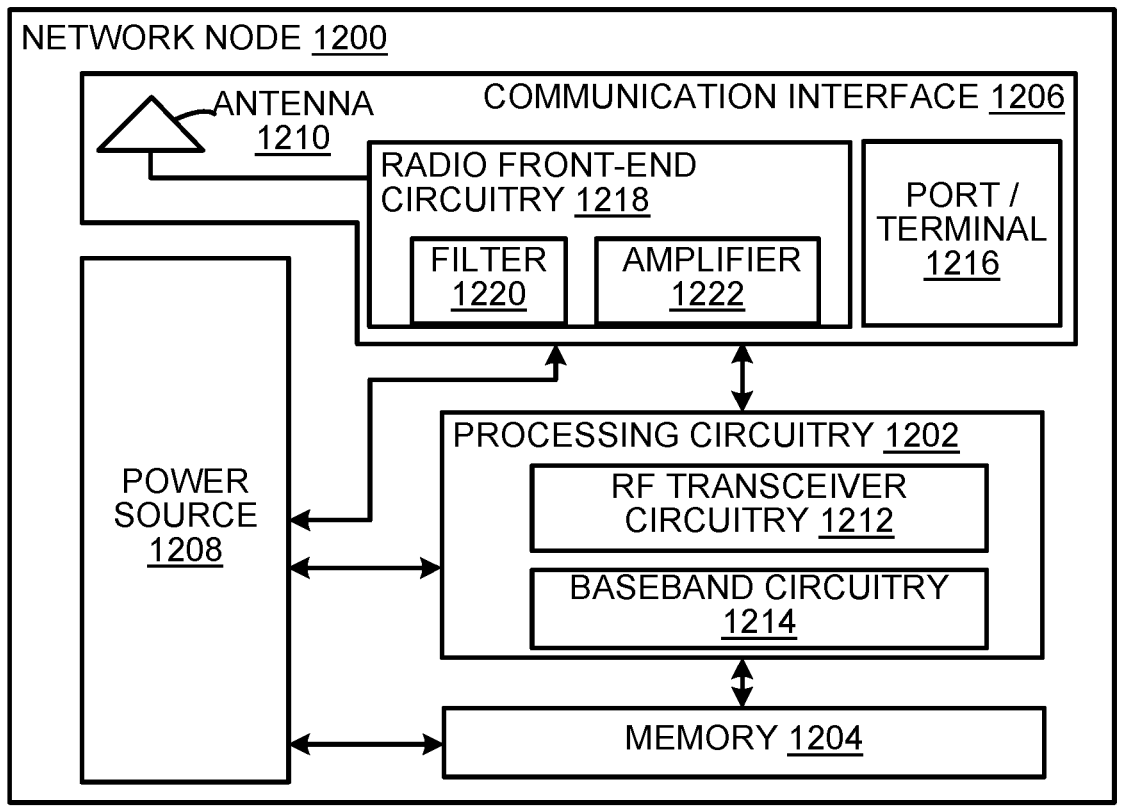
FIG. 12 is a block diagram of a network node in accordance with some embodiments.
Figure 14:
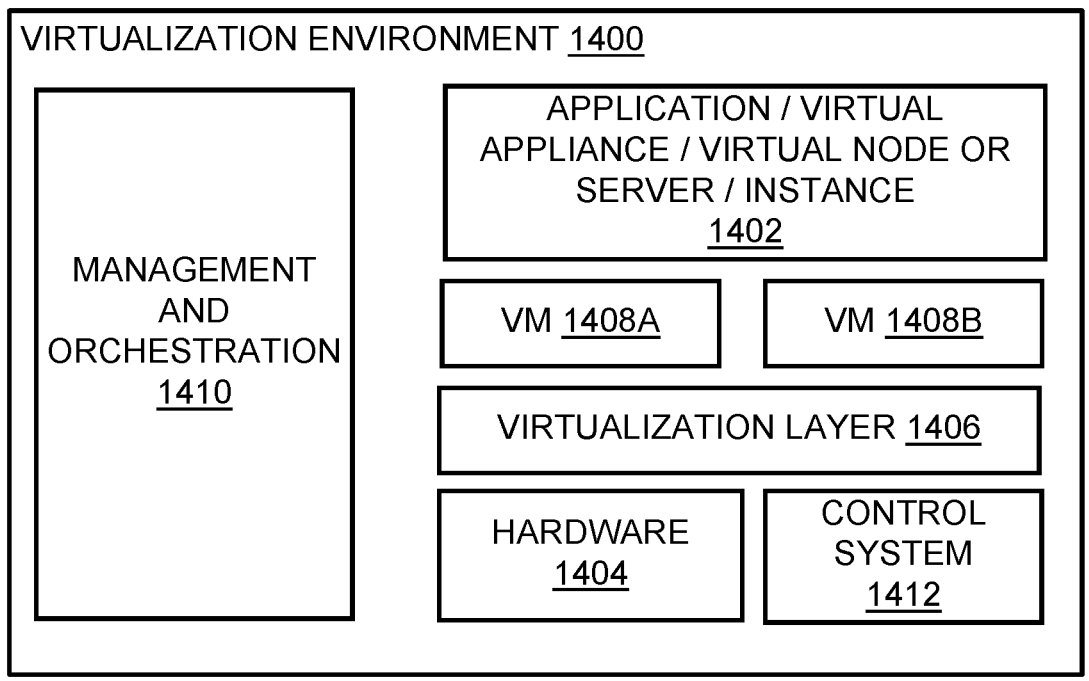
FIG. 14 is a block diagram of a virtualization environment in accordance with some embodiments.
Figure 15:
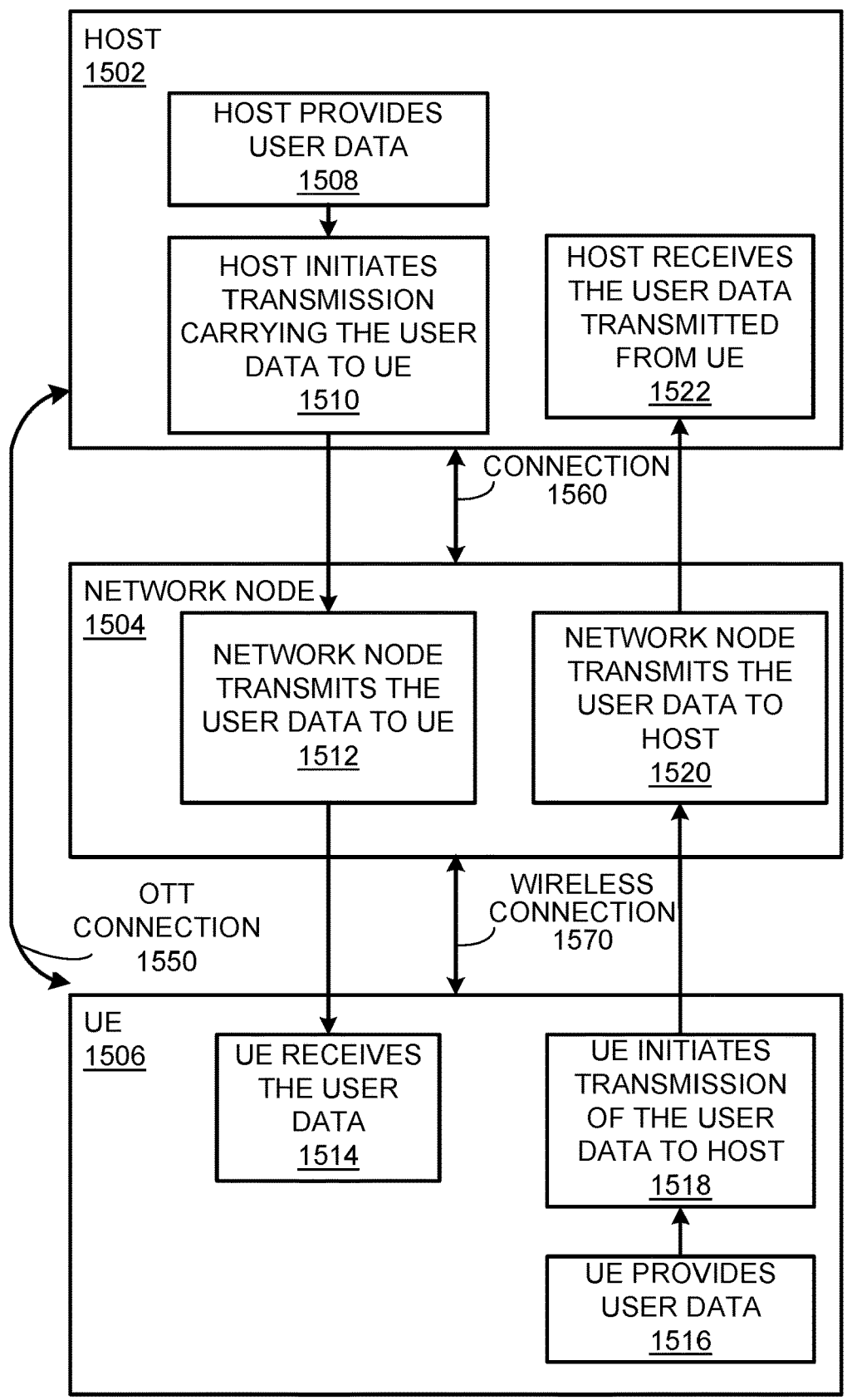
FIG. 15 is a block diagram of a host computer communicating via a base station with a user equipment over a partially wireless connection in accordance with some embodiments in accordance with some embodiments.

In the description that follows, while the network node may be any of the RAN node 400, network node 1010A, 1010B of FIG. 10, network node 1200 of FIG. 12, hardware 1404, or virtual machine 1408A, 1408B of FIG. 14, or network node 1504 of FIG. 15, the RAN node 400 shall be used to describe the functionality of the operations of the network node. Operations of the RAN node 400 (implemented using the structure of FIG. 4) will now be discussed with reference to the flow chart of FIG. 8 according to some embodiments of inventive concepts. For example, modules may be stored in memory 405 of FIG. 4, and these modules may provide instructions so that when the instructions of a module are executed by respective RAN node processing circuitry 403, processing circuitry 403 performs respective operations of the flow chart.

Figure 8:
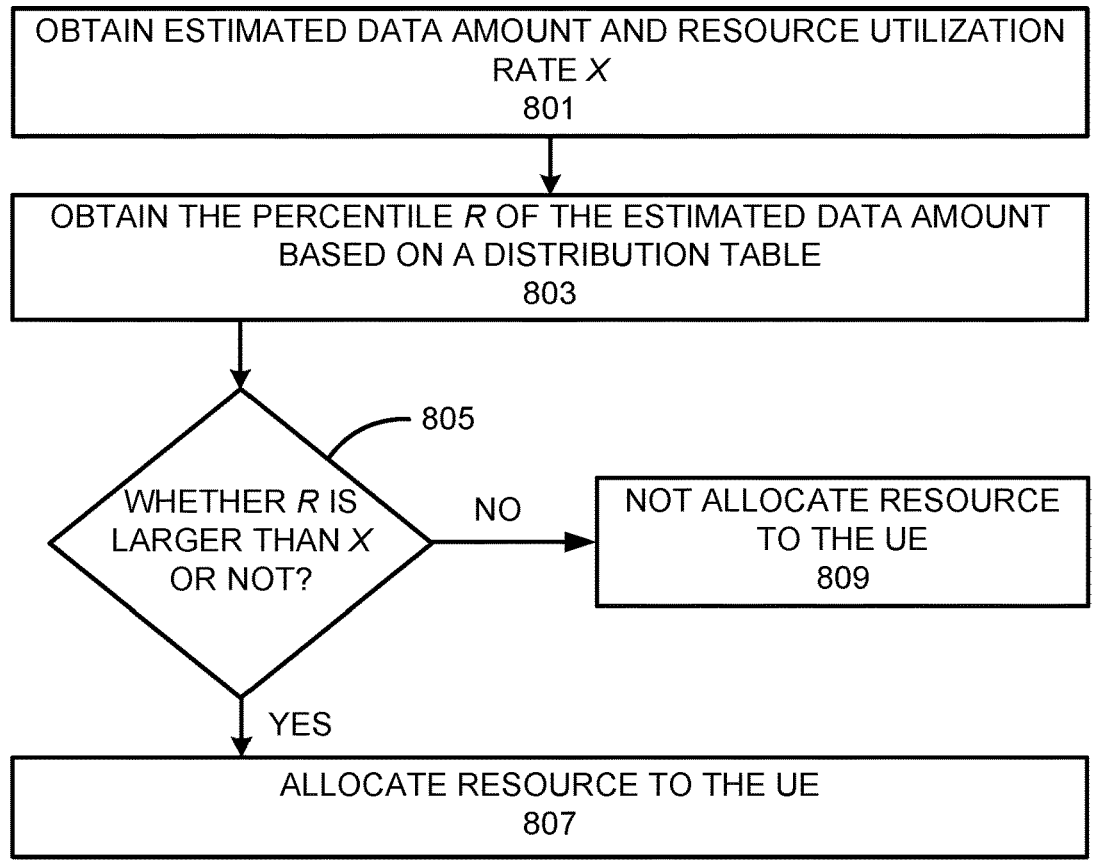
FIG. 8 is a flowchart of resource allocation according to some embodiments of inventive concepts.

An embodiment of inventive concepts of allocating resources is illustrated in FIG. 8. Turning to FIG. 8, in block 801, the processing circuitry 403 obtains an estimated (e.g., predicted) data amount of a user equipment, UE, and a resource utilization rate. In some of these embodiments, the resource utilization rate is an SRS utilization rate X.

In block 803, the processing circuitry 403 obtains a percentile R of the estimated data amount in a data amount distribution table. For example, the predicted data amount y is compared to a look-up table which records the percentile distribution of DL data amount in each decision period of a reference sample set of RRC sessions. For example, the sample set of RRC sessions that is used to develop the machine learning model in Step 2 of FIG. 6 can be used as a reference set. By comparing the estimated (i.e., inferred) data amount to the look-up table, the percentile R of the estimated data amount in the look-up table is obtained.

TABLE 1

| Data amount distribution | |
|---|---|
| Percentile | Value |
| ... | ... |

One example of the data amount distribution table is provided in Table 1. This table records all the integer percentiles of the data amount distribution. The percentile R is equal to n/100 if $y \geq v_n$ and $y < v_{n+1}$. The obtained percentile R is then compared by the network node in block 805 to the current resource utilization rate (e.g., the current SRS utilization rate X), i.e., the percentage of allocated resources such as allocated SRS resources.

If the percentile R of the estimated data amount is higher that the resource utilization rate (e.g., SRS utilization rate X), in block 807, the network node allocates a resource (or maintains an existing allocated resource) such as, for example an SRS (or maintains an existing allocated SRS resource), to the user. Otherwise, in block 809, the network node does not allocate a resource (e.g., an SRS) to the user (and should not maintain a resource (e.g., an SRS resource)).

Various operations from the flow chart of FIG. 8 may be optional with respect to some embodiments of RAN nodes and related methods. For example, operations of block 809 of FIG. 8 may be optional.

Figure 9:
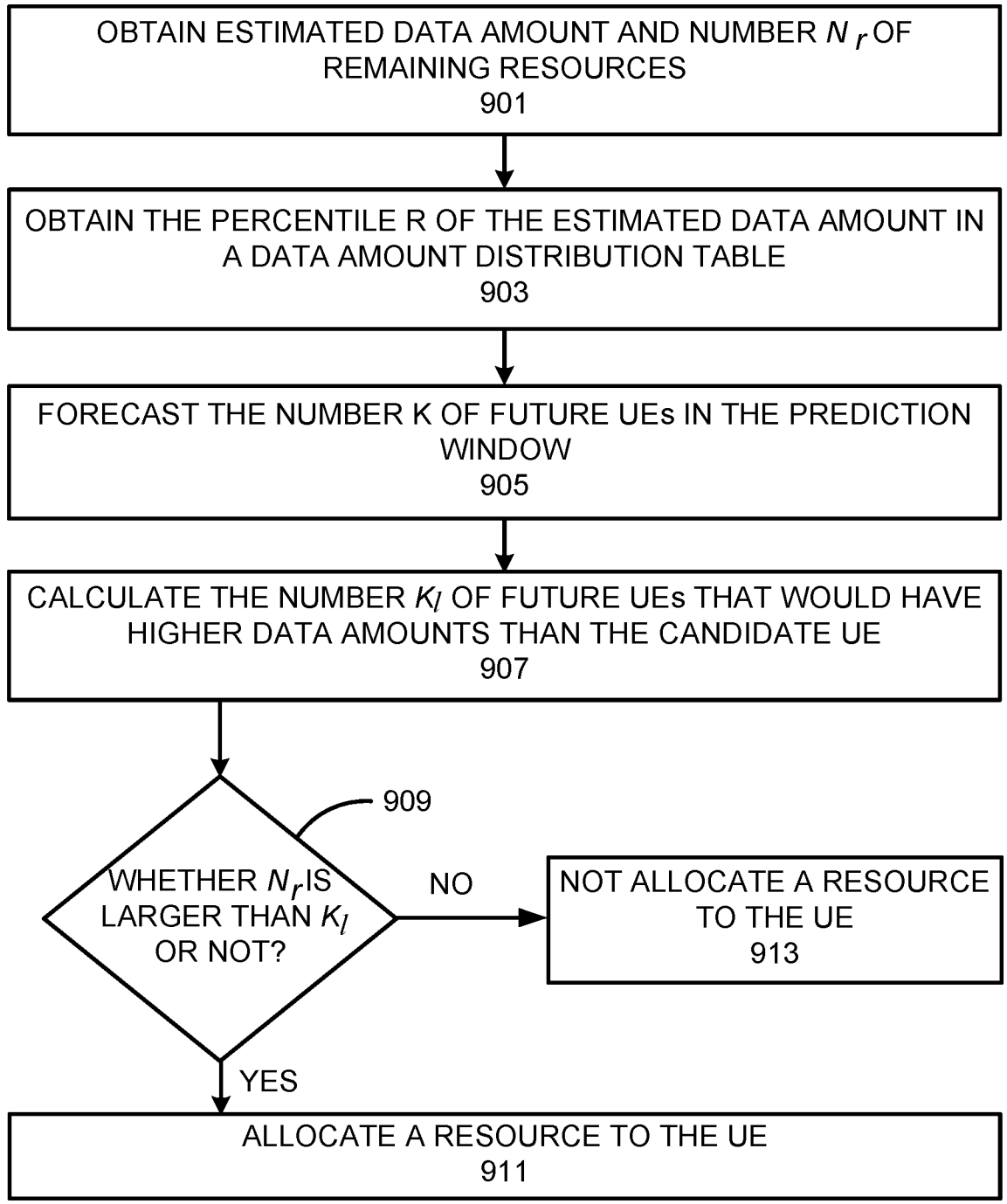
FIG. 9 is a flowchart of resource allocation according to other embodiments of inventive concepts.

An embodiment of inventive concepts of allocating resources is illustrated in FIG. 9. Turning to FIG. 9, in block 901, the processing circuitry 403 obtains an estimated (e.g., predicted) data amount of a candidate user equipment, UE, and a number $N_r$ of remaining resources (e.g., SRS resources) that can be allocated.

In block 903, the processing circuitry 403 obtains a percentile R of the estimated data amount in a data amount distribution table. One embodiment of obtaining the percentile R is by comparing the predicted data amount y to a look-up table which records the percentile distribution of DL data amount in each decision period of a reference sample set of RRC sessions. For example, the sample set of RRC sessions that is used to develop the machine learning model in Step 2 can be used as a reference set. By comparing the estimated (i.e., inferred) data amount to the look-up table, the percentile R of the estimated data amount in the look-up table is obtained. One example of the data amount distribution table is provided in Table 1. This table records all the integer percentiles of the data amount distribution. The percentile R is equal to n/100 if $y \geq v_n$ and $y < v_{n+1}$.

In block 905, the processing circuitry 403 forecasts the number K of future UEs (i.e., users) in the prediction window. In some embodiments, the network node forecasts the number K by estimating the number K with an existing traffic forecast method, such as AutoRegressive Integrated Moving Average (ARIMA), Holt-Winter Exponential Smoothing method, linear regression, neural network or random forest. In block 907, the processing circuitry 403 calculates a number $K_l$ of future UEs (i.e., users) that would have higher data amounts (e.g., a higher volume of data) than the estimated data amount of the candidate UE, and thereby would have higher preference value. In various embodiments, the network node calculates the number $K_l$ by multiplying the number K of future UEs with 1−R.

$$K_l = K^*(1-R)$$

In block 909, the processing circuitry 403 determines whether the number $N_r$ is greater than the calculated number $K_l$ of future UEs, i.e., $N_r > K_l$. If the number of remaining resources $N_r$ is greater than the calculated number $K_l$ of future UEs that would have higher preference value, the processing circuitry 403 will allocate a resource in block 911 to the candidate UE if the candidate UE has not been assigned any resource or maintain the resource if the candidate UE previously obtained a resource. Otherwise, in block 913, the processing circuitry 403 will not allocate a resource to the candidate UE. The candidate UE needs to release the resource if the candidate UE previously obtained a resource, or the candidate UE will not get any resource if the candidate UE has not been assigned any resource.

In yet another variant of the proposed solution, the look-up table is continuously updated by the network at the end of each UE session of a user with the DL data amount transmitted by that UE. Older data may be removed from the look-up table.

In yet another variant of the proposed solution, the machine learning algorithm does not predict transmission data amount directly but rather classifies whether the UE of the user belongs to one of N discreet classes, where each class represents a range of transmission data amounts. A new look-up in this case is constructed with N entries, where each entry maps a class to its percentile value.

Various operations from the flow chart of FIG. 9 may be optional with respect to some embodiments of RAN nodes and related methods. For example, operations of block 913 of FIG. 9 may be optional.

FIG. 10 shows an example of a communication system 1000 in accordance with some embodiments.

In the example, the communication system 1000 includes a telecommunication network 1002 that includes an access network 1004, such as a radio access network (RAN), and a core network 1006, which includes one or more core network nodes 1008. The access network 1004 includes one or more access network nodes, such as network nodes 1010a and 1010b (one or more of which may be generally referred to as network nodes 1010), or any other similar $3^{rd}$ Generation Partnership Project (3GPP) access node or non-3GPP access point. The network nodes 1010 facilitate direct or indirect connection of user equipment (UE), such as by connecting UEs 1012a, 1012b, 1012c, and 1012d (one or more of which may be generally referred to as UEs 1012) to the core network 1006 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1000 may include any number of wired or wireless networks, network nodes, UEs, and/or any other components or systems that may facilitate or participate in the communication of data and/or signals whether via wired or wireless connections. The communication system 1000 may include and/or interface with any type of communication, telecommunication, data, cellular, radio network, and/or other similar type of system.

The UEs 1012 may be any of a wide variety of communication devices, including wireless devices arranged, configured, and/or operable to communicate wirelessly with the network nodes 1010 and other communication devices. Similarly, the network nodes 1010 are arranged, capable, configured, and/or operable to communicate directly or indirectly with the UEs 1012 and/or with other network nodes or equipment in the telecommunication network 1002 to enable and/or provide network access, such as wireless network access, and/or to perform other functions, such as administration in the telecommunication network 1002.

In the depicted example, the core network 1006 connects the network nodes 1010 to one or more hosts, such as host 1016. These connections may be direct or indirect via one or more intermediary networks or devices. In other examples, network nodes may be directly coupled to hosts. The core network 1006 includes one more core network nodes (e.g., core network node 1008) that are structured with hardware and software components. Features of these components may be substantially similar to those described with respect to the UEs, network nodes, and/or hosts, such that the descriptions thereof are generally applicable to the corresponding components of the core network node 1008. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1016 may be under the ownership or control of a service provider other than an operator or provider of the access network 1004 and/or the telecommunication network 1002, and may be operated by the service provider or on behalf of the service provider. The host 1016 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1000 of FIG. 10 enables connectivity between the UEs, network nodes, and hosts. In that sense, the communication system may be configured to operate according to predefined rules or procedures, such as specific standards that include, but are not limited to: Global System for Mobile Communications (GSM): Universal Mobile Telecommunications System (UMTS): Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1002 is a cellular network that implements 3GPP standardized features. Accordingly, the telecommunications network 1002 may support network slicing to provide different logical networks to different devices that are connected to the telecommunication network 1002. For example, the telecommunications network 1002 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1012 are configured to transmit and/or receive information without direct human interaction. For instance, a UE may be designed to transmit information to the access network 1004 on a predetermined schedule, when triggered by an internal or external event, or in response to requests from the access network 1004. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 1014 communicates with the access network 1004 to facilitate indirect communication between one or more UEs (e.g., UE 1012*c* and/or 1012*d*) and network nodes (e.g., network node 1010*b*). In some examples, the hub 1014 may be a controller, router, content source and analytics, or any of the other communication devices described herein regarding UEs. For example, the hub 1014 may be a broadband router enabling access to the core network 1006 for the UEs. As another example, the hub 1014 may be a controller that sends commands or instructions to one or more actuators in the UEs. Commands or instructions may be received from the UEs, network nodes 1010, or by executable code, script, process, or other instructions in the hub 1014. As another example, the hub 1014 may be a data collector that acts as temporary storage for UE data and, in some embodiments, may perform analysis or other processing of the data. As another example, the hub 1014 may be a content source. For example, for a UE that is a VR headset, display, loudspeaker or other media delivery device, the hub 1014 may retrieve VR assets, video, audio, or other media or data related to sensory information via a network node, which the hub 1014 then provides to the UE either directly, after performing local processing, and/or after adding additional local content. In still another example, the hub 1014 acts as a proxy server or orchestrator for the UEs, in particular in if one or more of the UEs are low energy IoT devices.

The hub 1014 may have a constant/persistent or intermittent connection to the network node 1010*b*. The hub 1014 may also allow for a different communication scheme and/or schedule between the hub 1014 and UEs (e.g., UE 1012*c* and/or 1012*d*), and between the hub 1014 and the core network 1006. In other examples, the hub 1014 is connected to the core network 1006 and/or one or more UEs via a wired connection. Moreover, the hub 1014 may be configured to connect to an M2M service provider over the access network 1004 and/or to another UE over a direct connection. In some scenarios, UEs may establish a wireless connection with the network nodes 1010 while still connected via the hub 1014 via a wired or wireless connection. In some embodiments, the hub 1014 may be a dedicated hub—that is, a hub whose primary function is to route communications to/from the UEs from/to the network node 1010*b*. In other embodiments, the hub 1014 may be a non-dedicated hub—that is, a device which is capable of operating to route communications between the UEs and network node 1010*b*, but which is additionally capable of operating as a communication start and/or end point for certain data channels.

Figure 11:
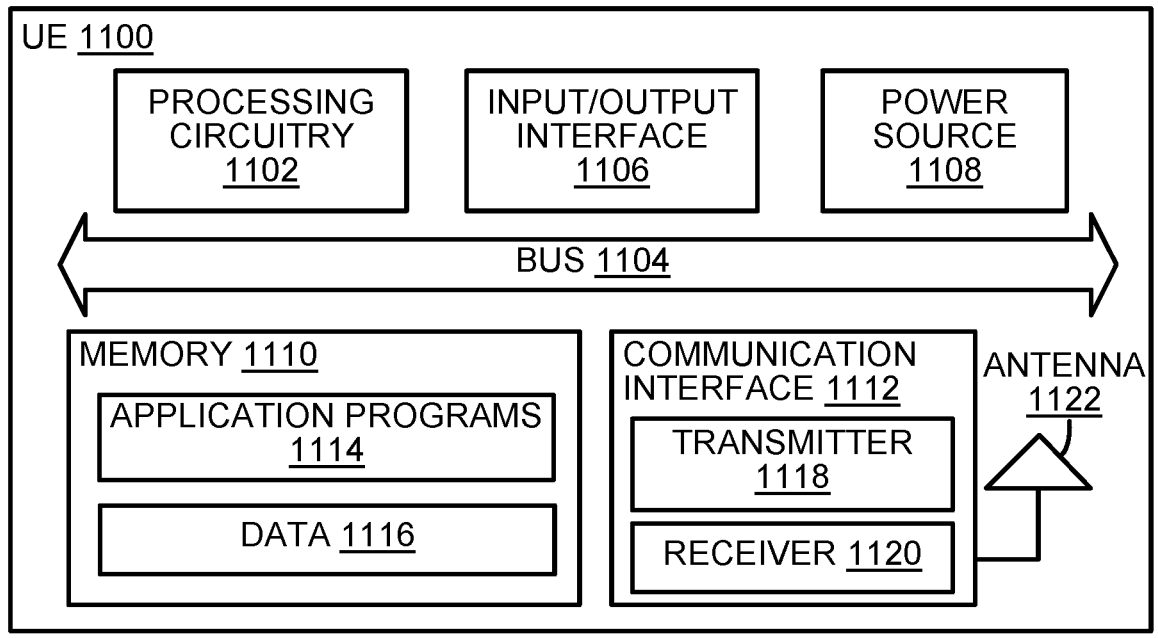
FIG. 11 is a block diagram of a user equipment in accordance with some embodiments

FIG. 11 shows a UE 1100 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1100 includes processing circuitry 1102 that is operatively coupled via a bus 1104 to an input/output interface 1106, a power source 1108, a memory 1110, a communication interface 1112, and/or any other component, or any combination thereof. Certain UEs may utilize all or a subset of the components shown in FIG. 11. The level of integration between the components may vary from one UE to another UE. Further, certain UEs may contain multiple instances of a component, such as multiple processors, memories, transceivers, transmitters, receivers, etc.

The processing circuitry 1102 is configured to process instructions and data and may be configured to implement any sequential state machine operative to execute instructions stored as machine-readable computer programs in the memory 1110. The processing circuitry 1102 may be implemented as one or more hardware-implemented state machines (e.g., in discrete logic, field-programmable gate arrays (FPGAs), application specific integrated circuits (ASICs), etc.); programmable logic together with appropriate firmware: one or more stored computer programs, general-purpose processors, such as a microprocessor or digital signal processor (DSP), together with appropriate software: or any combination of the above. For example, the processing circuitry 1102 may include multiple central processing units (CPUs).

In the example, the input/output interface 1106 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1100. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1108 is structured as a battery or battery pack. Other types of power sources, such as an external power source (e.g., an electricity outlet), photovoltaic device, or power cell, may be used. The power source 1108 may further include power circuitry for delivering power from the power source 1108 itself, and/or an external power source, to the various parts of the UE 1100 via input circuitry or an interface such as an electrical power cable. Delivering power may be, for example, for charging of the power source 1108. Power circuitry may perform any formatting, converting, or other modification to the power from the power source 1108 to make the power suitable for the respective components of the UE 1100 to which power is supplied.

The memory 1110 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1110 includes one or more application programs 1114, such as an operating system, web browser application, a widget, gadget engine, or other application, and corresponding data 1116. The memory 1110 may store, for use by the UE 1100, any of a variety of various operating systems or combinations of operating systems.

The memory 1110 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1110 may allow the UE 1100 to access instructions, application programs and the like, stored on transitory or non-transitory memory media, to off-load data, or to upload data. An article of manufacture, such as one utilizing a communication system may be tangibly embodied as or in the memory 1110, which may be or comprise a device-readable storage medium.

The processing circuitry 1102 may be configured to communicate with an access network or other network using the communication interface 1112. The communication interface 1112 may comprise one or more communication subsystems and may include or be communicatively coupled to an antenna 1122. The communication interface 1112 may include one or more transceivers used to communicate, such as by communicating with one or more remote transceivers of another device capable of wireless communication (e.g., another UE or a network node in an access network). Each transceiver may include a transmitter 1118 and/or a receiver 1120 appropriate to provide network communications (e.g., optical, electrical, frequency allocations, and so forth). Moreover, the transmitter 1118 and receiver 1120 may be coupled to one or more antennas (e.g., antenna 1122) and may share circuit components, software or firmware, or alternatively be implemented separately.

In the illustrated embodiment, communication functions of the communication interface 1112 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1112, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1100 shown in FIG. 11.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

FIG. 12 shows a network node 1200 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1200 includes a processing circuitry 1202, a memory 1204, a communication interface 1206, and a power source 1208. The network node 1200 may be composed of multiple physically separate components (e.g., a NodeB component and a RNC component, or a BTS component and a BSC component, etc.), which may each have their own respective components. In certain scenarios in which the network node 1200 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1200 may be configured to support multiple radio access technologies (RATs). In such embodiments, some components may be duplicated (e.g., separate memory 1204 for different RATs) and some components may be reused (e.g., a same antenna 1210 may be shared by different RATs). The network node 1200 may also include multiple sets of the various illustrated components for different wireless technologies integrated into network node 1200, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1200.

The processing circuitry 1202 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1200 components, such as the memory 1204, to provide network node 1200 functionality.

In some embodiments, the processing circuitry 1202 includes a system on a chip (SOC). In some embodiments, the processing circuitry 1202 includes one or more of radio frequency (RF) transceiver circuitry 1212 and baseband processing circuitry 1214. In some embodiments, the radio frequency (RF) transceiver circuitry 1212 and the baseband processing circuitry 1214 may be on separate chips (or sets of chips), boards, or units, such as radio units and digital units. In alternative embodiments, part or all of RF transceiver circuitry 1212 and baseband processing circuitry 1214 may be on the same chip or set of chips, boards, or units.

The memory 1204 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1202. The memory 1204 may store any suitable instructions, data, or information, including a computer program, software, an application including one or more of logic, rules, code, tables, and/or other instructions capable of being executed by the processing circuitry 1202 and utilized by the network node 1200. The memory 1204 may be used to store any calculations made by the processing circuitry 1202 and/or any data received via the communication interface 1206. In some embodiments, the processing circuitry 1202 and memory 1204 is integrated.

The communication interface 1206 is used in wired or wireless communication of signaling and/or data between a network node, access network, and/or UE. As illustrated, the communication interface 1206 comprises port(s)/terminal(s) 1216 to send and receive data, for example to and from a network over a wired connection. The communication interface 1206 also includes radio front-end circuitry 1218 that may be coupled to, or in certain embodiments a part of, the antenna 1210. Radio front-end circuitry 1218 comprises filters 1220 and amplifiers 1222. The radio front-end circuitry 1218 may be connected to an antenna 1210 and processing circuitry 1202. The radio front-end circuitry may be configured to condition signals communicated between antenna 1210 and processing circuitry 1202. The radio front-end circuitry 1218 may receive digital data that is to be sent out to other network nodes or UEs via a wireless connection. The radio front-end circuitry 1218 may convert the digital data into a radio signal having the appropriate channel and bandwidth parameters using a combination of filters 1220 and/or amplifiers 1222. The radio signal may then be transmitted via the antenna 1210. Similarly, when receiving data, the antenna 1210 may collect radio signals which are then converted into digital data by the radio front-end circuitry 1218. The digital data may be passed to the processing circuitry 1202. In other embodiments, the communication interface may comprise different components and/or different combinations of components.

In certain alternative embodiments, the network node 1200 does not include separate radio front-end circuitry 1218, instead, the processing circuitry 1202 includes radio front-end circuitry and is connected to the antenna 1210. Similarly, in some embodiments, all or some of the RF transceiver circuitry 1212 is part of the communication interface 1206. In still other embodiments, the communication interface 1206 includes one or more ports or terminals 1216, the radio front-end circuitry 1218, and the RF transceiver circuitry 1212, as part of a radio unit (not shown), and the communication interface 1206 communicates with the baseband processing circuitry 1214, which is part of a digital unit (not shown).

The antenna 1210 may include one or more antennas, or antenna arrays, configured to send and/or receive wireless signals. The antenna 1210 may be coupled to the radio front-end circuitry 1218 and may be any type of antenna capable of transmitting and receiving data and/or signals wirelessly. In certain embodiments, the antenna 1210 is separate from the network node 1200 and connectable to the network node 1200 through an interface or port.

The antenna 1210, communication interface 1206, and/or the processing circuitry 1202 may be configured to perform any receiving operations and/or certain obtaining operations described herein as being performed by the network node. Any information, data and/or signals may be received from a UE, another network node and/or any other network equipment. Similarly, the antenna 1210, the communication interface 1206, and/or the processing circuitry 1202 may be configured to perform any transmitting operations described herein as being performed by the network node. Any information, data and/or signals may be transmitted to a UE, another network node and/or any other network equipment.

The power source 1208 provides power to the various components of network node 1200 in a form suitable for the respective components (e.g., at a voltage and current level needed for each respective component). The power source 1208 may further comprise, or be coupled to, power management circuitry to supply the components of the network node 1200 with power for performing the functionality described herein. For example, the network node 1200 may be connectable to an external power source (e.g., the power grid, an electricity outlet) via an input circuitry or interface such as an electrical cable, whereby the external power source supplies power to power circuitry of the power source 1208. As a further example, the power source 1208 may comprise a source of power in the form of a battery or battery pack which is connected to, or integrated in, power circuitry. The battery may provide backup power should the external power source fail.

Embodiments of the network node 1200 may include additional components beyond those shown in FIG. 12 for providing certain aspects of the network node's functionality, including any of the functionality described herein and/or any functionality necessary to support the subject matter described herein. For example, the network node 1200 may include user interface equipment to allow input of information into the network node 1200 and to allow output of information from the network node 1200. This may allow a user to perform diagnostic, maintenance, repair, and other administrative functions for the network node 1200.

Figure 13:
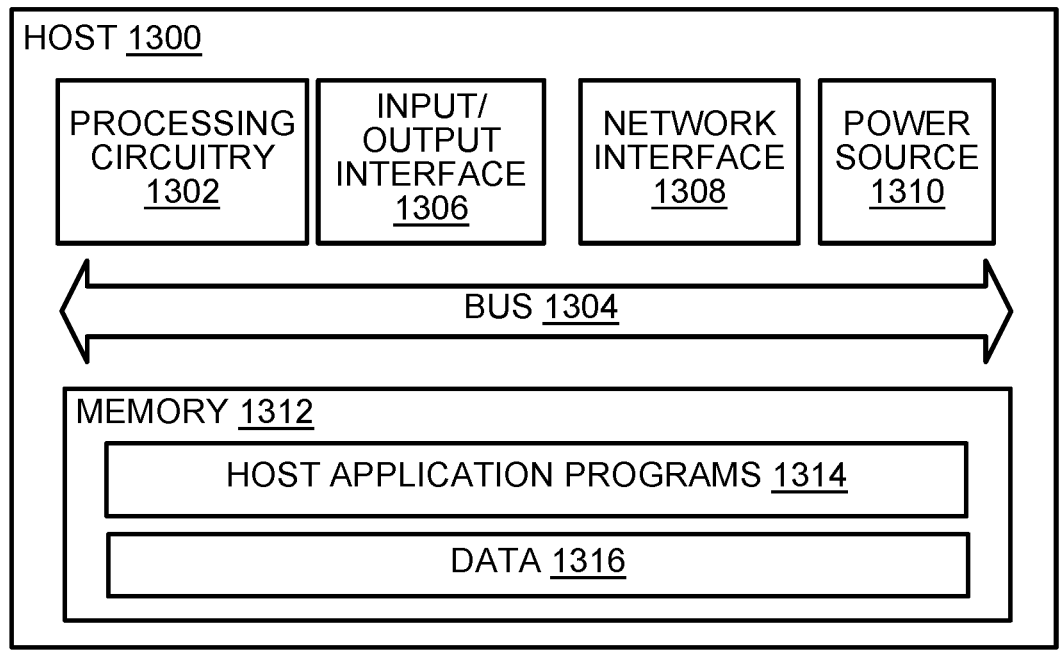
FIG. 13 is a block diagram of a host computer communicating with a user equipment in accordance with some embodiments.

FIG. 13 is a block diagram of a host 1300, which may be an embodiment of the host 1016 of FIG. 10, in accordance with various aspects described herein. As used herein, the host 1300 may be or comprise various combinations hardware and/or software, including a standalone server, a blade server, a cloud-implemented server, a distributed server, a virtual machine, container, or processing resources in a server farm. The host 1300 may provide one or more services to one or more UEs.

The host 1300 includes processing circuitry 1302 that is operatively coupled via a bus 1304 to an input/output interface 1306, a network interface 1308, a power source 1310, and a memory 1312. Other components may be included in other embodiments. Features of these components may be substantially similar to those described with respect to the devices of previous figures, such as FIGS. 11 and 12, such that the descriptions thereof are generally applicable to the corresponding components of host 1300.

The memory 1312 may include one or more computer programs including one or more host application programs 1314 and data 1316, which may include user data, e.g., data generated by a UE for the host 1300 or data generated by the host 1300 for a UE. Embodiments of the host 1300 may utilize only a subset or all of the components shown. The host application programs 1314 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1314 may also provide for user authentication and licensing checks and may periodically report health, routes, and content availability to a central node, such as a device in or on the edge of a core network. Accordingly, the host 1300 may select and/or indicate a different host for over-the-top services for a UE. The host application programs 1314 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

FIG. 14 is a block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1400 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1402 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1404 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1406 (also referred to as hypervisors or virtual machine monitors (VMMs)), provide VMs 1408*a* and 1408*b* (one or more of which may be generally referred to as VMs 1408), and/or perform any of the functions, features and/or benefits described in relation with some embodiments described herein. The virtualization layer 1406 may present a virtual operating platform that appears like networking hardware to the VMs 1408.

The VMs 1408 comprise virtual processing, virtual memory, virtual networking or interface and virtual storage, and may be run by a corresponding virtualization layer 1406. Different embodiments of the instance of a virtual appliance 1402 may be implemented on one or more of VMs 1408, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1408 may be a software implementation of a physical machine that runs programs as if they were executing on a physical, non-virtualized machine. Each of the VMs 1408, and that part of hardware 1404 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1408 on top of the hardware 1404 and corresponds to the application 1402.

Hardware 1404 may be implemented in a standalone network node with generic or specific components. Hardware 1404 may implement some functions via virtualization. Alternatively, hardware 1404 may be part of a larger cluster of hardware (e.g. such as in a data center or CPE) where many hardware nodes work together and are managed via management and orchestration 1410, which, among others, oversees lifecycle management of applications 1402. In some embodiments, hardware 1404 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1412 which may alternatively be used for communication between hardware nodes and radio units.

FIG. 15 shows a communication diagram of a host 1502 communicating via a network node 1504 with a UE 1506 over a partially wireless connection in accordance with some embodiments. Example implementations, in accordance with various embodiments, of the UE (such as a UE 1012*a* of FIG. 10 and/or UE 1100 of FIG. 11), network node (such as network node 1010a of FIG. 10 and/or network node 1200 of FIG. 12), and host (such as host 1016 of FIG. 10 and/or host 1300 of FIG. 13) discussed in the preceding paragraphs will now be described with reference to FIG. 15.

Like host 1300, embodiments of host 1502 include hardware, such as a communication interface, processing circuitry, and memory. The host 1502 also includes software, which is stored in or accessible by the host 1502 and executable by the processing circuitry. The software includes a host application that may be operable to provide a service to a remote user, such as the UE 1506 connecting via an over-the-top (OTT) connection 1550 extending between the UE 1506 and host 1502. In providing the service to the remote user, a host application may provide user data which is transmitted using the OTT connection 1550.

The network node 1504 includes hardware enabling it to communicate with the host 1502 and UE 1506. The connection 1560 may be direct or pass through a core network (like core network 1006 of FIG. 10) and/or one or more other intermediate networks, such as one or more public, private, or hosted networks. For example, an intermediate network may be a backbone network or the Internet.

The UE 1506 includes hardware and software, which is stored in or accessible by UE 1506 and executable by the UE's processing circuitry. The software includes a client application, such as a web browser or operator-specific "app" that may be operable to provide a service to a human or non-human user via UE 1506 with the support of the host 1502. In the host 1502, an executing host application may communicate with the executing client application via the OTT connection 1550 terminating at the UE 1506 and host 1502. In providing the service to the user, the UE's client application may receive request data from the host's host application and provide user data in response to the request data. The OTT connection 1550 may transfer both the request data and the user data. The UE's client application may interact with the user to generate the user data that it provides to the host application through the OTT connection 1550.

The OTT connection 1550 may extend via a connection 1560 between the host 1502 and the network node 1504 and via a wireless connection 1570 between the network node 1504 and the UE 1506 to provide the connection between the host 1502 and the UE 1506. The connection 1560 and wireless connection 1570, over which the OTT connection 1550 may be provided, have been drawn abstractly to illustrate the communication between the host 1502 and the UE 1506 via the network node 1504, without explicit reference to any intermediary devices and the precise routing of messages via these devices.

As an example of transmitting data via the OTT connection 1550, in step 1508, the host 1502 provides user data, which may be performed by executing a host application. In some embodiments, the user data is associated with a particular human user interacting with the UE 1506. In other embodiments, the user data is associated with a UE 1506 that shares data with the host 1502 without explicit human interaction. In step 1510, the host 1502 initiates a transmission carrying the user data towards the UE 1506. The host 1502 may initiate the transmission responsive to a request transmitted by the UE 1506. The request may be caused by human interaction with the UE 1506 or by operation of the client application executing on the UE 1506. The transmission may pass via the network node 1504, in accordance with the teachings of the embodiments described throughout this disclosure. Accordingly, in step 1512, the network node 1504 transmits to the UE 1506 the user data that was carried in the transmission that the host 1502 initiated, in accordance with the teachings of the embodiments described throughout this disclosure. In step 1514, the UE 1506 receives the user data carried in the transmission, which may be performed by a client application executed on the UE 1506 associated with the host application executed by the host 1502.

In some examples, the UE 1506 executes a client application which provides user data to the host 1502. The user data may be provided in reaction or response to the data received from the host 1502. Accordingly, in step 1516, the UE 1506 may provide user data, which may be performed by executing the client application. In providing the user data, the client application may further consider user input received from the user via an input/output interface of the UE 1506. Regardless of the specific manner in which the user data was provided, the UE 1506 initiates, in step 1518, transmission of the user data towards the host 1502 via the network node 1504. In step 1520, in accordance with the teachings of the embodiments described throughout this disclosure, the network node 1504 receives user data from the UE 1506 and initiates transmission of the received user data towards the host 1502. In step 1522, the host 1502 receives the user data carried in the transmission initiated by the UE 1506.

In an example scenario, factory status information may be collected and analyzed by the host 1502. As another example, the host 1502 may process audio and video data which may have been retrieved from a UE for use in creating maps. As another example, the host 1502 may collect and analyze real-time data to assist in controlling vehicle congestion (e.g., controlling traffic lights). As another example, the host 1502 may store surveillance video uploaded by a UE. As another example, the host 1502 may store or control access to media content such as video, audio, VR or AR which it can broadcast, multicast or unicast to UEs. As other examples, the host 1502 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1550 between the host 1502 and UE 1506, in response to variations in the measurement results. The measurement procedure and/or the network functionality for reconfiguring the OTT connection may be implemented in software and hardware of the host 1502 and/or UE 1506. In some embodiments, sensors (not shown) may be deployed in or in association with other devices through which the OTT connection 1550 passes: the sensors may participate in the measurement procedure by supplying values of the monitored quantities exemplified above, or supplying values of other physical quantities from which software may compute or estimate the monitored quantities. The reconfiguring of the OTT connection 1550 may include message format, retransmission settings, preferred routing etc.: the reconfiguring need not directly alter the operation of the network node 1504. Such procedures and functionalities may be known and practiced in the art. In certain embodiments, measurements may involve proprietary UE signaling that facilitates measurements of throughput, propagation times, latency and the like, by the host 1502. The measurements may be implemented in that software causes messages to be transmitted, in particular empty or 'dummy' messages, using the OTT connection 1550 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia." may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

The invention claimed is:

1. A method performed in a network node comprising:
obtaining an estimated data amount of a user equipment, UE, and a resource utilization rate;
obtaining a percentile R of the estimated data amount based on a data amount distribution table;
comparing the percentile R to the resource utilization rate; and
responsive to the percentile R being higher than the resource utilization rate, allocating a resource to the UE.

2. The method of claim 1, wherein the resource utilization rate comprises a sounding reference signal, SRS, resource utilization rate X, and allocating the resource to the UE comprises allocating an SRS resource to the UE.

3. The method of claim 1 wherein obtaining the estimated data amount comprises:
observing user traffic of the UE for a selected time period;
collecting the data amount of the user in the selected time period; and
estimating the data amount based on the collected data amount of the user.

4. The method of claim 1, wherein obtaining the percentile R comprises:
comparing the estimated data amount to data in the data amount distribution table; and
obtaining the percentile R based on a location of the estimated data amount in the data amount distribution table.

5. The method of claim 4 wherein the data amount distribution table comprises a look-up table.

6. The method of claim 1, further comprising updating the data amount distribution table at an end of a UE session of a user with the downlink data amount transmitted to the UE.

7. The method of claim 1, further comprising:
responsive to the percentile R not being higher than the resource utilization rate, not allocating a resource to the UE.

8. The method of claim 7 wherein not allocating the resource to the UE comprises transmitting a command to the UE to release a previously allocated resource.

9. The method of claim 1, wherein allocating the resource to the UE comprises enabling the UE to maintain a previously allocated resource.

10. A network node comprising:
processing circuitry; and
memory coupled with the processing circuitry, wherein the memory includes instructions that when executed by the processing circuitry causes the network node to perform operations according to claim 1.

11. A computer program product comprising a non-transitory storage medium including program code to be executed by processing circuitry of a network node, whereby execution of the program code causes the network node to perform operations according to claim 1.

12. A method performed in a network node comprising:
obtaining an estimated data amount of a candidate user equipment, UE, and a number $N_r$ of remaining resources;
obtaining a percentile R of the estimated data amount based on a data amount distribution table;
forecasting a number K of future users in a prediction window;
calculating a number $K_l$ of future users that would have higher data amounts than the estimated data amount of the candidate user;
determining whether the number $N_r$ is greater than the calculated number $K_l$ of future users; and
responsive to the number $N_r$ being greater than the calculated number $K_l$, allocating a resource to the UE.

13. The method of claim 12 wherein the resources comprise sounding reference signal, SRS, resources, and allocating the resource to the UE comprises allocating an SRS resource to the UE.

14. The method of claim 12 wherein obtaining the estimated data amount comprises:
observing user traffic of the UE for a selected time period;
collecting the data amount of the user in the selected time period; and
estimating the data amount based on the collected data amount of the user.

15. The method of claim 12, wherein obtaining the percentile R comprises:
comparing the estimated data amount to data in the data amount distribution table; and obtaining the percentile R based on a location of the estimated data amount in the data amount distribution table.

16. The method of claim 15 wherein the data amount distribution table comprises a look-up table.

17. The method of claim 12, further comprising updating the data amount distribution table at an end of a UE session of a user with the downlink data amount transmitted to the UE.

18. The method of claim 12 wherein forecasting the number K of future users in a prediction window comprises estimating the number K using a traffic forecast method.

19. The method of claim 18 wherein using the traffic forecast method comprises using at least one of an AutoRegressive Integrated Moving Average, ARIMA, Holt-Winter Exponential Smoothing method, linear regression method, neural network method or random forest method.

20. The method of claim 12, wherein calculating the number $K_l$ comprises calculating the number $K_l$ in accordance with $$K_l = K * (1-R).$$

21. The method of claim 12, further comprising:
responsive to the number $N_r$ not being greater than the calculated number $K_l$, not allocating a resource to the UE.

22. The method of claim 21 wherein not allocating the resource to the UE comprises transmitting a command to the UE to release a previously allocated resource.

23. The method of claim 12, wherein allocating the resource to the UE comprises enabling the UE to maintain a previously allocated resource.

24. A network node comprising:
processing circuitry; and
memory coupled with the processing circuitry, wherein the memory includes instructions that when executed by the processing circuitry causes the network node to perform operations according to claim 12.

25. A computer program product comprising a non-transitory storage medium including program code to be executed by processing circuitry of a network node, whereby execution of the program code causes the network node to perform operations according to claim 12.

* * * * *